(12) United States Patent
Chang

(10) Patent No.: US 7,047,151 B2
(45) Date of Patent: May 16, 2006

(54) SYSTEM AND METHOD FOR DETECTING DEFECTS OF OBJECTS BASED ON A CAD PLATFORM

(75) Inventor: Chih-Kuang Chang, Tu-chen (TW)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 36 days.

(21) Appl. No.: 10/857,492

(22) Filed: May 28, 2004

(65) Prior Publication Data

US 2004/0254758 A1   Dec. 16, 2004

(30) Foreign Application Priority Data

May 20, 2003   (CN) ................................ 92114489A

(51) Int. Cl.
*G01C 17/00* (2006.01)
*G01B 5/28* (2006.01)
*G06K 9/00* (2006.01)

(52) U.S. Cl. ..................... 702/152; 702/35; 702/36; 382/149

(58) Field of Classification Search ............... 702/152, 702/35, 36, 40, 153; 382/141, 149, 151, 382/152
See application file for complete search history.

(56) References Cited

U.S. PATENT DOCUMENTS

| 6,377,865 | B1 | 4/2002 | Edelsbrunner et al. |
| 6,608,913 | B1 | 8/2003 | Hinton et al. |
| 6,701,006 | B1 | 3/2004 | Moore et al. |
| 6,834,253 | B1 * | 12/2004 | Wu et al. .................. 702/155 |
| 6,925,198 | B1 * | 8/2005 | Scharlack et al. .......... 382/128 |
| 2003/0074174 | A1 * | 4/2003 | Fu et al. ....................... 703/13 |

* cited by examiner

*Primary Examiner*—John Barlow
*Assistant Examiner*—Meagan S Walling
(74) *Attorney, Agent, or Firm*—Wei Te Chung

(57) ABSTRACT

A system and method for detecting defects of objects based on a CAD (Computer-Aided Design) platform includes a measurement apparatus (10), an application server (12), and a database server (14). The application server includes a data acquiring module (120) for acquiring point cloud data of an object and acquiring a three-dimensional digital model of the object; a point cloud cutting (121) module for cleaning and editing the point cloud data; a point cloud filtering module (122) for filtering the point cloud data; a data aligning module (123) for aligning the point cloud data with the three-dimensional digital model of the object; a data comparing module (124) for comparing the point cloud data with the three-dimensional digital model of the object; and a report management module (125) for generating a color comparison report. A related method is also disclosed.

8 Claims, 3 Drawing Sheets

SYSTEM AND METHOD FOR DETECTING DEFECTS OF OBJECTS BASED ON A CAD PLATFORM

BACKGROUND OF THE INVENTION

1. Field of the Invention

The present invention generally relates to Computer-Aided detection systems and methods, and more particularly to a system and method for detecting defects of objects based on a CAD (Computer-Aided Design) platform.

2. Related Art of the Invention

Product quality has long been one of the most important factors in maintaining a typical manufacturing enterprise's competitive ability. How to improve the quality of products is an important ongoing pursuit of such enterprise. It is essential to verify the correctness and accuracy of components of various assembled products. As many manufactured products become increasingly complex, the burden of verification grows correspondingly. There is now a burgeoning need to verify components of products rapidly and precisely. Nevertheless, many enterprises still perform verification by employing numerous manual tasks and test programs that are non-standard. This can slow down output, and can seriously affect the accuracy and consistency of the verification performed.

With the performance of computer hardware and software continually improving and with the prices of such equipment becoming more competitive, computers nowadays play a major role in the process of verification. Computer equipment can greatly improve the efficiency and accuracy of verification. The art of verifying three-dimensional digital models of objects is disclosed in patents such as U.S. Pat. No. 6,377,865, entitled Methods of Generating Three-dimensional Digital Models of Objects by Wrapping Point Cloud Data Points. This invention can automatically represent a physical object in the form of point cloud data, and can verify the object by comparing a three-dimensional digital model of the object with the point cloud data. The point cloud data are images obtained by measuring the object using a measurement apparatus. The three-dimensional digital model is generally obtainable from a customer. However the invention cannot automatically manage the process of comparing the three-dimensional model with the point cloud data, and cannot generate user-friendly data such as color comparison reports.

Thus there is need to provide a system and method for conveniently inspecting and analyzing objects based on a CAD platform.

SUMMARY OF THE INVENTION

Accordingly, a main objective of the present invention is to provide a system and method for conveniently detecting defects of objects based on a CAD platform.

To accomplish the above objective, a system for automatically detecting defects of objects based on a CAD platform in accordance with a preferred embodiment of the present invention is provided. The system comprises a measurement apparatus, an application server, and a database server. The application server has a plurality of software function modules installed therein for processing point cloud data in order to detect any defects of objects. The application server comprises a data acquiring module, a point cloud cutting module, a point cloud filtering module, a data aligning module, a data comparing module, and a report management module. The data acquiring module is used for acquiring point cloud data of an object measured by the measurement apparatus, and a three-dimensional digital model of the object from the database server. The point cloud cutting module is used for cleaning and editing the point cloud data by cutting overlapping areas of the point cloud data. The point cloud filtering module is used for filtering the point cloud data to make the point clouds smooth and regular. The data aligning module is used for aligning the point cloud data with the three-dimensional digital model of the object. The data comparing module is used for comparing the point cloud data with the three-dimensional digital model of the object, obtaining any deviations in x-y-z Cartesian coordinates, and indicating different deviations by using different colors. The report management module is used for generating a color comparison report according to comparison results generated by the data comparing module, and outputting and storing the color comparison report.

Further, the present invention provides a method for automatically detecting defects of objects based on a CAD platform, the method comprising the steps of: (a) acquiring point cloud data measured from the surface of an object; (b) cutting overlapping areas of the point cloud data; (c) filtering the point cloud data; (d) acquiring a corresponding three-dimensional digital model of the object; (e) comparing the point cloud data with the three-dimensional digital model of the object, and obtaining any deviations in x-y-z Cartesian coordinates; (f) indicating different deviations by using different colors; and (g) generating a color comparison report.

Other objects, advantages and novel features of the present invention will be drawn from the following detailed description of the present invention with the attached drawings, in which:

DETAILED DESCRIPTION OF THE INVENTION

Figure 1:
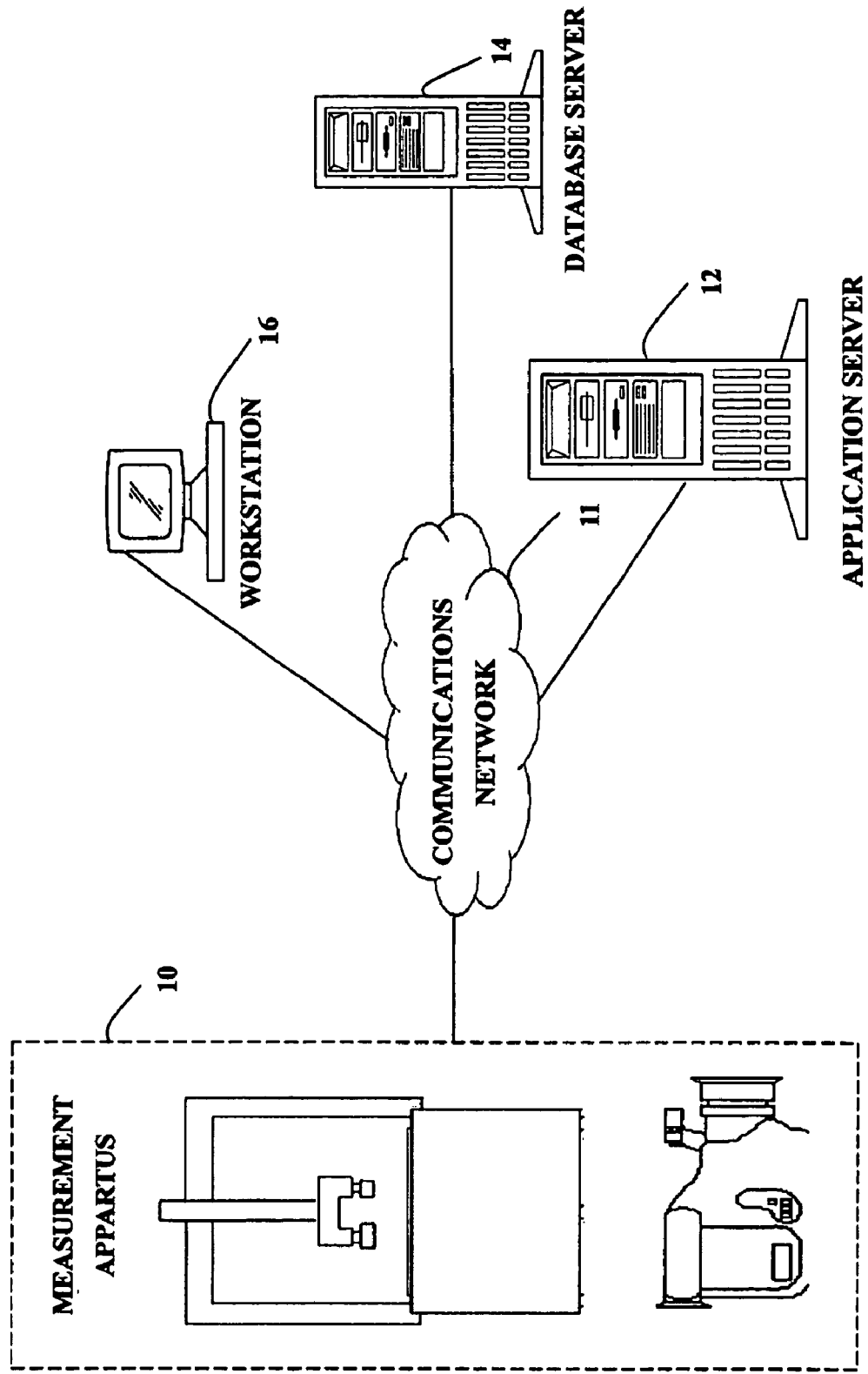
FIG. 1 is a schematic diagram of hardware configuration of a system for detecting defects of objects based on a CAD platform in accordance with the preferred embodiment of the present invention.

FIG. 1 is a schematic diagram of hardware configuration of a system for detecting defects of objects based on a CAD platform (hereinafter, "the system") in accordance with the preferred embodiment of the present invention. The system comprises a measurement apparatus 10, an application server 12, a database server 14 and a plurality of workstations 16 (only one shown), each being in communication with all of the others via a communications network 11. The communications network 11 may be an intranet, the Internet, or any other suitable type of communications link.

The measurement apparatus 10 may contain various data acquisition devices including laser scanners, coordinate measuring machines and x-ray scanners, for acquiring point cloud data measured from a object. The point cloud data can be created by scanning the surface of the object (surface scan) or by scanning the entire region of the object (solid scan), and comprises a plurality of discrete points. The database server 14 contains a database therein. The database is for storing a corresponding three-dimensional digital model of the object, which may be provided by a customer, and for storing the point cloud data acquired by the measurement apparatus 10. The database server 14 is also used for managing maintenance of the point cloud data and the three-dimensional digital model. Such maintenance includes reading, writing, deleting, modifying, and backing up the data. The application server 12 has a plurality of software function modules installed therein, for processing the point cloud data in order to detect any defects of the object. The workstations 16 are located at various internal departments of an organization operating the system. Users in the organization can access the application server 12 via the workstations 16, and thus obtain results of detection of any defects of the object.

Figure 2:
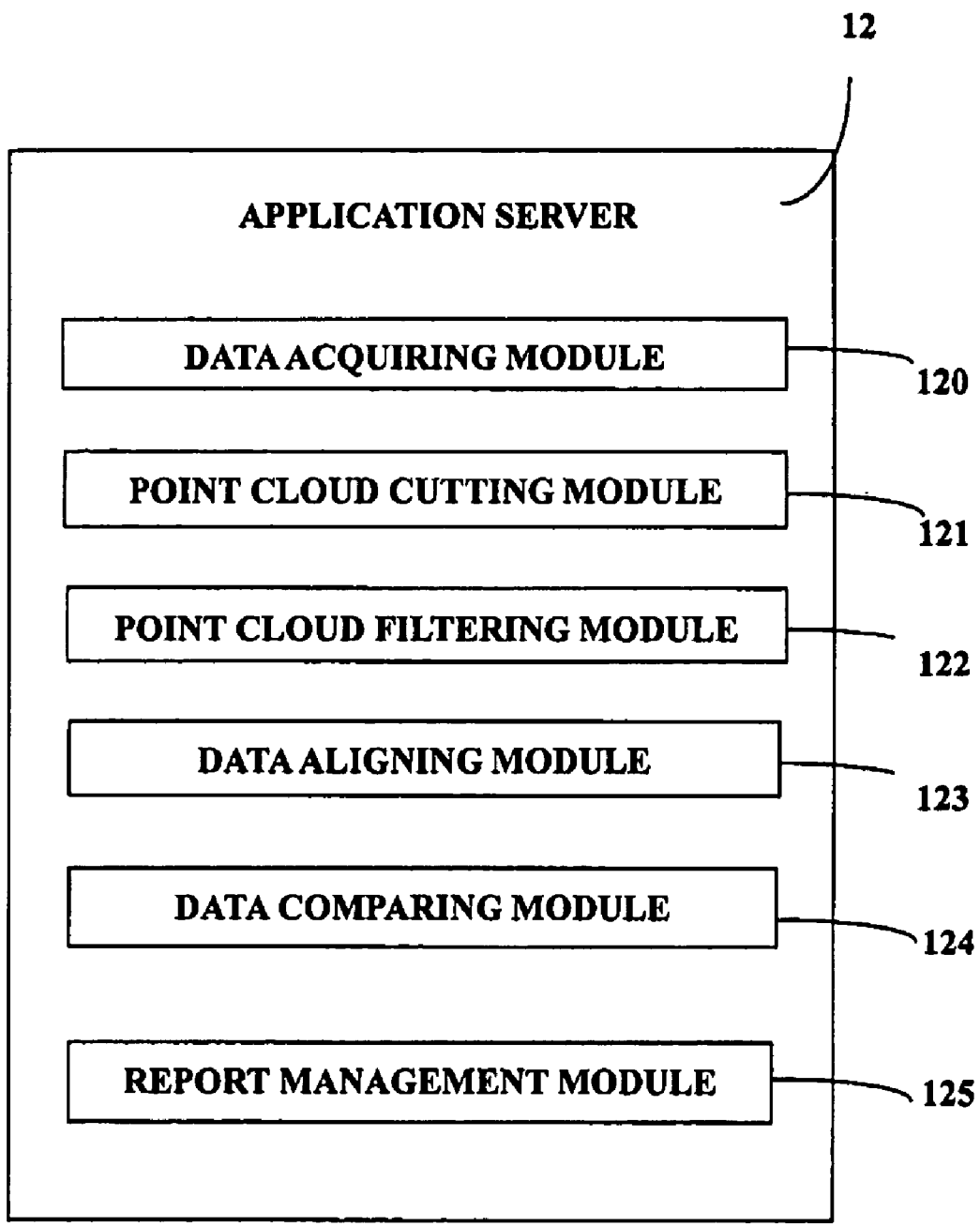
FIG. 2 is a schematic diagram showing main software function modules of an application server of the system of FIG. 1.

FIG. 2 is a schematic diagram showing main software function modules of the application server 12. The application server 12 is installed with a plurality of detection programs for detecting any defects of objects. The application server 12 comprises a data acquiring module 120, a point cloud cutting module 121, a point cloud filtering module 122, a data aligning module 123, a data comparing module 124, and a report management module 125. The data acquiring module 120 is used for acquiring point cloud data of an object measured by the measurement apparatus 10, and acquiring a three-dimensional digital model of the object from the database server 14. The point cloud cutting module 121 is used for cleaning and editing the point cloud data by cutting overlapping areas of the point cloud data. The point cloud filtering module 122 is used for filtering the point cloud data to make the point clouds smooth and regular. The data aligning module 123 is used for aligning the point cloud data with the three-dimensional digital model of the object. The data comparing module 124 is used for comparing the point cloud data with the three-dimensional digital model of the object, obtaining deviations in x-y-z Cartesian coordinates, and indicating different deviations by using different colors. The report management module 125 is used for generating a color comparison report according to comparison results generated by the data comparing module 124, and outputting and storing the color comparison report.

Figure 3:
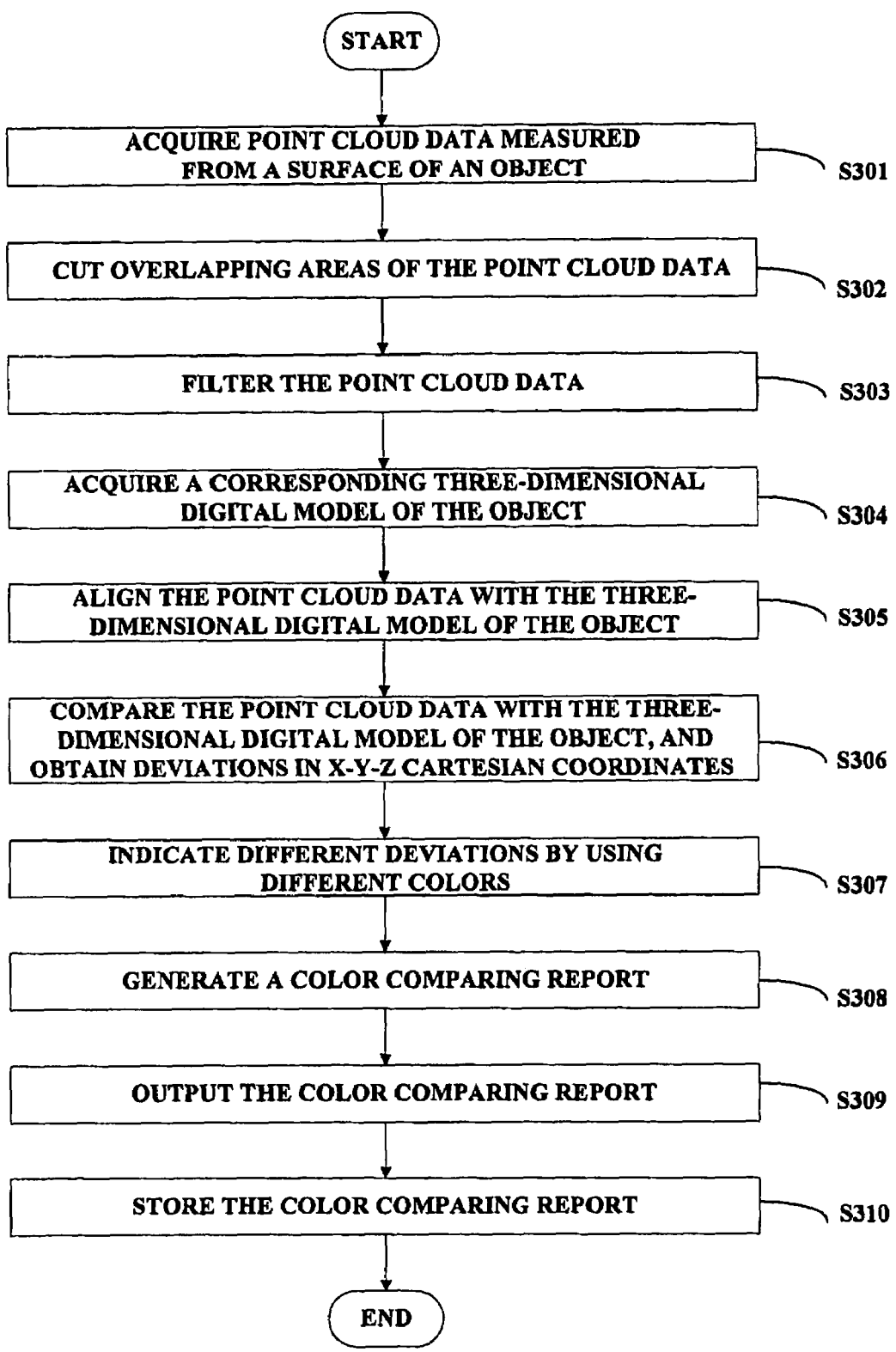
FIG. 3 is a flowchart of a preferred method for detecting defects of objects based on a CAD platform according to the present invention.

FIG. 3 is a flowchart of a preferred method for detecting defects of an object based on a CAD platform according to the present invention. In step S301, the data acquiring module 120 acquires point cloud data measured from a surface of the object by the measurement apparatus 10, and stores the point cloud data in the database server 14. Users in the organization can access the database server 14 via the workstations 16, and obtain the point cloud data. In step S302, the point cloud cutting module 121 cleans and edits the point cloud data by cutting overlapping areas of the point cloud data. In step S303, the point cloud filtering module 122 filters the point clouds to make the point clouds smooth and regular. This can be done by reducing noise of the point clouds to make the point clouds smooth, and by reducing densities of the point clouds to make the point clouds regular. In step S304, the data acquiring module 120 acquires a corresponding three-dimensional digital model of the object from the database server 14. In step S305, the data aligning module 123 aligns the point cloud data with the three-dimensional digital model of the object. In step S306, the data comparing module 124 compares the point cloud data with the three-dimensional digital model of the object, and obtains any deviations in x-y-z Cartesian coordinates. In step S307, the data comparing module 124 indicates different deviations by using different colors. In step S308, the report management module 125 generates a color comparison report according to comparison results of step S307. In step S309, the report management module 125 outputs the color comparison report to any of the workstations 16. In step S310, the report management module 125 stores the color comparison report in the database server 14.

Although the present invention has been specifically described on the basis of a preferred embodiment and a preferred method, the invention is not to be construed as being limited thereto. Various changes or modifications may be made to said embodiment and method without departing from the scope and spirit of the invention.

What is claimed is:

1. A system for detecting defects of objects based on a CAD (Computer-Aided Design) platform, the system comprising a measurement apparatus, art application server, and a database server, wherein the application server comprises:

a data acquiring module for acquiring point cloud data of an object measured by the measurement apparatus and acquiring a three-dimensional digital model of the object stored in the database server;

a point cloud cutting module for cleaning and editing the point cloud data by cutting overlapping areas of the point cloud data;

a point cloud filtering module for filtering the point cloud data to make the point clouds smooth and regular;

a data aligning module for aligning the point cloud data with the three-dimensional digital model of the object; and a data comparing module for comparing the point cloud data with the three-dimensional digital model of the object, obtaining any deviations in x-y-z Cartesian coordinates, and indicating different deviations by using different colors.

2. The system according to claim 1, wherein the application server further comprises a report management module for generating a color comparison report according to comparison results generated by the data comparing module.

3. The system according to claim 1, wherein the measurement apparatus is used for generating point cloud data of measured objects.

4. The system according to claim 3, wherein the measurement apparatus is any one or more of a laser scanner, a coordinate measuring machine and an x-ray scanner.

5. A method for detecting defects of objects based on a CAD (Computer-Aided Design) platform, the method comprising the steps of:
- acquiring point cloud data measured from an object;
- cutting overlapping areas of the point cloud data;
- filtering the point cloud data;
- acquiring a corresponding three-dimensional digital model of the object;
- comparing the point cloud data with the three-dimensional digital model of the object, and obtaining any deviations in x-y-z Cartesian coordinates;
- indicating different deviations by using different colors; and
- generating a color comparison report.

6. The method according to claim 5, further comprising the step of outputting the color comparison report.

7. The method according to claim 5, further comprising the step of storing the color comparison report.

8. A method for detecting defects of objects based on a CAD platform, the method comprising the steps of:
- acquiring point cloud data measured from an object;
- cutting overlapping areas of the point cloud data;
- filtering the point cloud data;
- acquiring a corresponding three-dimensional digital model of the object;
- aligning the point cloud data with the three-dimensional digital model of the object;
- comparing the point cloud data with the three-dimensional digital model of the object, and obtaining any deviations in x-y-z Cartesian coordinates;
- indicating different deviations by using differently colored expressioins; and
- generating a comparison report based at least in part on the differently colored expressions.

* * * * *